Aug. 16, 1949.　　　　　B. GOODMAN　　　　　2,479,229
TIRE SPOTTER
Filed Sept. 3, 1946　　　　　　　　　　2 Sheets-Sheet 1
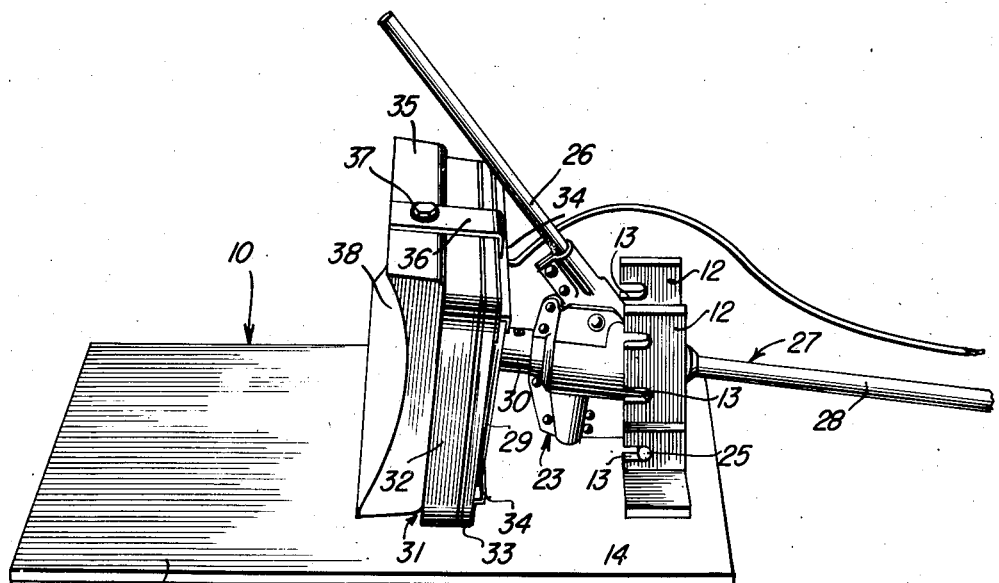
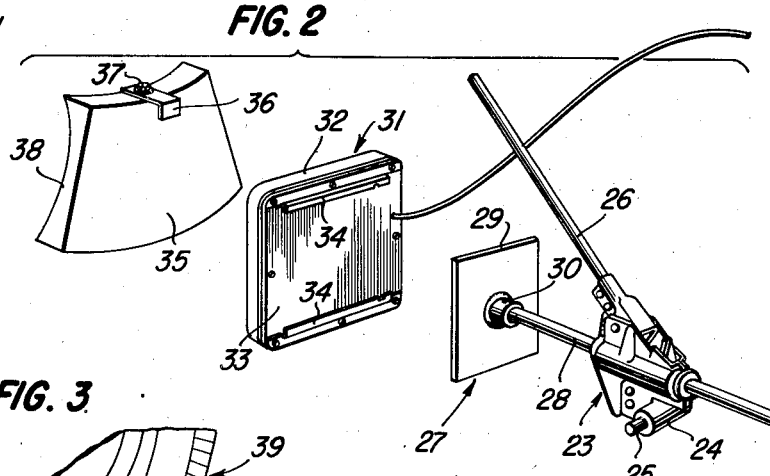
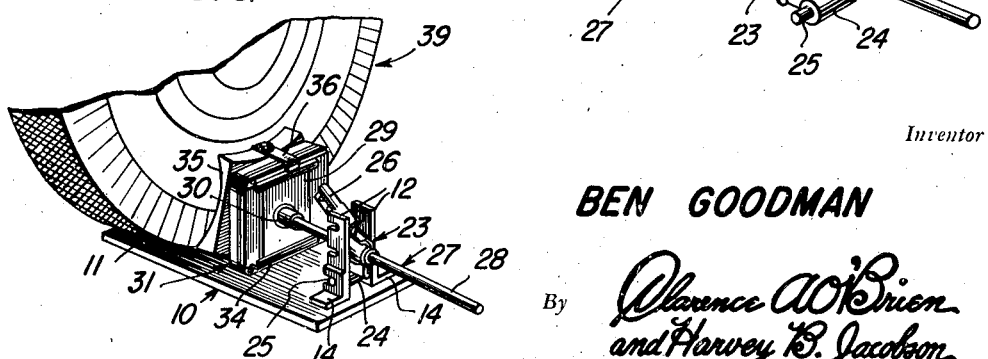
Inventor
BEN GOODMAN Aug. 16, 1949.   B. GOODMAN   2,479,229
TIRE SPOTTER
Filed Sept. 3, 1946   2 Sheets-Sheet 2
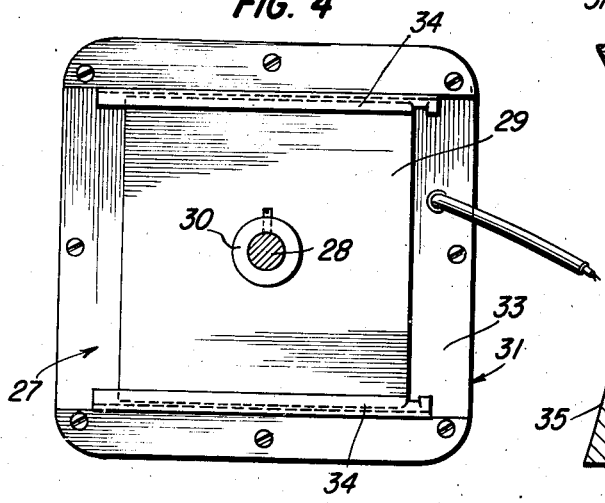
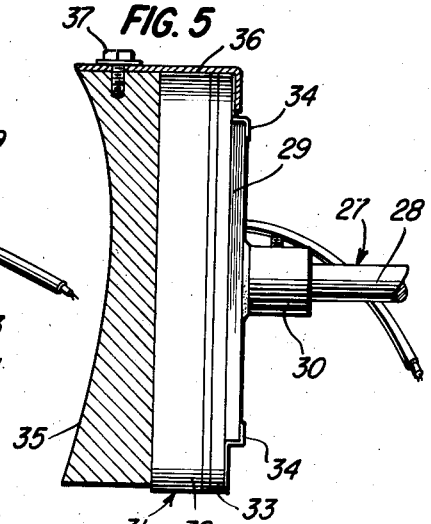
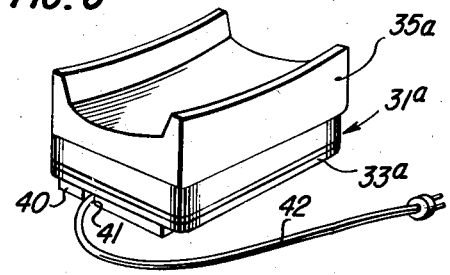
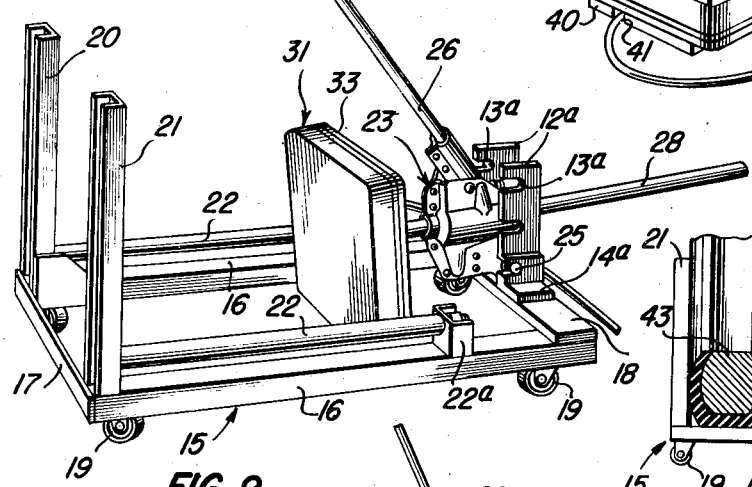
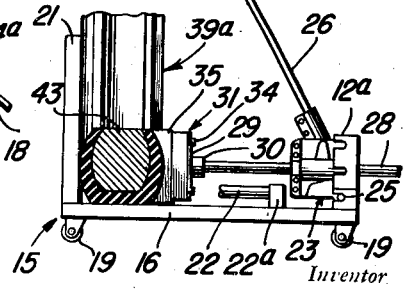
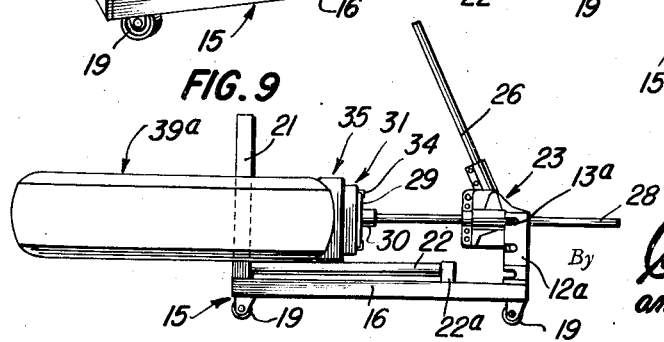
Inventor
BEN GOODMAN Patented Aug. 16, 1949

2,479,229

UNITED STATES PATENT OFFICE 2,479,229

TIRE SPOTTER

Ben Goodman, Baltimore, Md., assignor to Greenmount Manufacturing Company, Baltimore, Md.

Application September 3, 1946, Serial No. 694,648

4 Claims. (Cl. 18—18)

The present invention relates to a novel and improved tire spotter which is expressly, although not necessarily adapted for spot repairing heavy duty truck and similar tire casings.

More specifically, the invention appertains to portable spot vulcanizing means characterized broadly, by an electrical heating unit and an associated heated form or plate cooperable therewith.

More specifically, the invention comprises a base, an electrical heat generating unit, a presser plate detachably cooperable with said unit, a detachable end thrust device including a head releasably connectible with the heating unit, a friction jack for supporting said device, and means on said base for adjustably and detachably sustaining the friction jack in a readily operable position.

Novelty is predicated on a base including a pair of spaced parallel uprights, said uprights having corresponding vertical edges formed with notches and said notches providing keeper seats for accommodation of keeper pins on the aforementioned friction jack.

In carrying out the principles of the invention I employ, on the one hand, a simplified base comprising a rectangular plate provided with the aforementioned notched uprights. For other purposes, I utilize a base in the form of a wheeled truck, said truck embodying a framework for supporting the notched upright, further including rollers to facilitate handling heavy duty tires, these in conjunction with vertical standards at one end of the framework so positioned and located as to facilitate steadying and positioning of the tire for spotting in either vertical or horizontal positions.

Other objects, features and advantages will become more readily apparent from the following description and the accompanying illustrative drawings.

In the drawings, wherein like numerals are employed to designate like parts throughout the views:

Figure 1 is a perspective view of a tire spotter constructed in accordance with the principles of the present invention and showing the simple base construction.

Figure 2 is an "exploded" perspective view illustrating the thrust device, friction jack, electrical heating unit and pressure casting or block cooperable with said unit.

Figure 3 is a small perspective view showing the manner in which the construction of Figure 1 is utilized in association with a tire casing.

Figure 4 is an end view of the means shown in Figure 5 with the pressure block or casting removed.

Figure 5 is a side elevational view showing the electric heating unit, headed end of the thrust device, the casting being attached and shown in section.

Figure 6 is a perspective view of a modified phase of the invention employed for tread spotting purposes.

Figure 7 is a perspective view showing the base means in the form of a wheeled truck.

Figure 8 is a side view of the assemblage seen in Figure 7, this on a smaller scale, and said view showing how a tire casing is spotted when held in a vertical position, and Figure 9 is a view like Figure 8 showing the same spotter and illustrating the tire casing when it takes a horizontal position.

By way of introduction, it is to be pointed out that one form of the invention is seen in Figures 1 and 3, another form in Figure 6, and the third form in Figure 7.

In respect to Figures 1 and 3 as compared to Figure 7, it will be noted that the only variation in the complete assemblage has to do with the base means. In other words, there is a simple base in Figure 1, for example, and a somewhat more complicated base in Figure 7, the latter being in the form of a wheeled truck. I desire to comprehend both arrangements in a generic sense and hence the truck is covered broadly as "base means" and is a simple plate in Figure 1.

Confining the description, at this stage to said "base means" and having reference first to Figures 1 and 3, it will be seen that said means is generally denoted in Figures 1 and 3 by the numeral 10. Said means 10 comprises a flat rectangular plate of appropriate material and size, the plate being denoted by the numeral 11. The upright means at the right-hand end comprises a pair of L-brackets. These brackets are, broadly, uprights, the upright portions being denoted by the numeral 12 and said portions having corresponding edges provided with selectively usable notches 13 forming keeper seats. The laterally directed lower end portions 14 are attached to the plate 11.

The base means shown in Figures 7, 8 and 9 is, as before stated, in the form of a portable truck, the same being generally denoted by the numeral 15. The truck comprises an openwork frame including longitudinal members 16 and transverse end members 17 and 18. Suitably mounted casters 19 are provided at the respective corner portions. A pair of channel irons 20 and 21 are connected to the frame structure at one end and extend perpendicularly and function as tire guide and positioning posts. The numerals 22 designate idling rollers mounted at corresponding ends in the posts 20 and 21 and mounted for rotation at opposite ends in suitable fixtures 22a on the side frame members 16. The same uprights are used on this truck as are used on the base plate in Figure 1. Here again, I employ, as before stated, a pair of duplicate L-shaped brackets. The vertical portions 12a are provided with seating and keeper notches 13a and the lateral ends 14a are secured rigidly to the cross-piece or end member 18.

It will be noted that the description is being prepared to bring out the fact that the base means 10 is broadly equivalent to the base means 15 and that in both arrangements notched L-shaped brackets are provided in the base means to constitute the uprights for adjustably supporting the friction jack. It is felt, in this connection, that since the friction jack and parts immediately associated therewith constitute a phase of the invention which is the same in both Figures 1 and 7, it is proper to identify the parts by like reference numerals, this to bring out the fact that said parts are identical.

I make no claim to the friction jack 23, for which reason the structural details have not been specifically illustrated. Perhaps however, it is novel to provide such a jack with an adapter 24 having end keeper pins or lugs 25, these to be adjustably associated with the selectively usable keeper notches in the aforementioned base supported uprights. The jack includes a detachable rod 26 fitting into a suitable socket and functioning as an operating lever.

The thrust device 27 comprises a rod 28 adjustably mounted and held in the jack and a head plate 29 having a socket 30 fitting on the rod and held in place by a set-screw.

The electrical heater, which may be of any type, is denoted, generally speaking, by the numeral 31. I make no claim to the casing 32 and the internal electrical heating elements, therefore, I have not shown said elements. I simply claim the use of a heater of this type having a backing plate 33 with assembling and retention and suitably offset flanges 34 to permit said unit 31 to be slidably and separably mounted on said plate or head 29.

The pressure block, an aluminum casting, is denoted by the numeral 35 and is designed to fit in flat firm contact with the casing 32, the same having an L-clip 36 held in place by a set-screw 37. This provides a suitable clip or hook to detachably mount the block on the heating unit 31. The side 38 coming in contact with the tire casing 39 is of concaved form to fit the contour of the wall which is to be repaired. It is necessary to employ a number of such blocks with varying contours to meet differing situations, as is obvious.

Coming now to Figure 6, this shows a simple spotter for making a repair in the tread of a tire casing. It comprises a pressure block 35a which is detachably clipped to the heater unit 31a. The unit here is the same as that shown in the other figures and includes a backing plate 33a with assembling flanges (not shown) to accommodate a ground contacting plate 40. The plate is provided with a clearance groove 41 to accommodate the current conducting wire 42. In this form of the invention, the device is interposed between the ground and tread of the tire while the tire is on the vehicle. The weight of the vehicle and tire serves to hold the spotter in place for quick and efficient use.

The tire is prepared for vulcanizing and repairing in the usual way, by removing the old stock at the point of rupture and filling the cavity with raw vulcanizable rubber. Then, the block and heating means is brought into contact with the spot to be vulcanized and the operation is performed as is customarily done by persons familiar with car repairing requirements.

In the form of the invention illustrated in Figures 1 to 3, it will be seen that the repair is made while the tire is on the wheel of the truck or other vehicle. The wheel is simply run over one end of the base plate 11 as shown in Figure 3. Then the parts are brought into position as here shown, this through the medium of the aforementioned friction jack. Inasmuch as the drawings are highly illustrative, it is thought unnecessary to dwell upon the operation other than to explain that the block is brought against the spot to be repaired, by way of the thrust device 27, the jack means 23 and the heating device or unit 31 carried by the head of the thrust device. Of course, the jack is properly positioned by locating the journals or lugs 25 in proper notches in the uprights on the base means. Other than this, it is felt that a description of the operation is not necessary. However, in connection with Figures 7 and 8, it will be seen that the rollers on the truck base means 15, that is the rollers 22, facilitate holding the heavy tire in place. The tire is repaired either in a vertical position as shown in Figure 8 or in horizontal position as shown in Figure 9. The posts 20 and 21 facilitate holding the tire in place and a filler device or core 43 is placed in the tire casing at the desired spotting point.

It is evident that whereas the means of Figures 1 and 3, and the means of Figure 6, serve to make repairs while the tire is on the wheel, the means shown in Figures 7 to 9 inclusive is such as to permit the repair job to be accomplished with the tire casing removed from the wheel. It is evident too, that the posts 20 and 21, as shown in Figures 8 and 9, constitute serviceable elements in properly handling the tire 39a in both vertical and horizontal positions. Suitable ramps (not shown) may be employed to facilitate rolling the heavy tire on and off the base means 15.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A tire spotter of the class described, comprising a relatively large and flat rectangular base plate, said plate being of an area sufficient to accommodate and seat a heavy-duty tire while the latter is still mounted on the vehicle, said plate being free of obstructions throughout the major median as well as one end portion to permit said median and end portions to be slid between the ground and tread of said tire when the latter is slightly jacked above the ground, said plate being then anchored against slippage so long as the tire and attending vehicle weight rest thereon, a pair of uprights attached and rising vertically from the end portion of said plate opposite to that first mentioned, a jack adjustably supported on said uprights, and a pressure providing thrust device, said thrust device including a head and rod, said rod being operatively mounted on said jack, and an electrically heated hot plate comprising a casing having a flat backing plate provided with spaced parallel offset assembling and retaining flanges, said head being likewise flat and abutting and being in firm contact with said backing plate and edge portions of said head being detachably mounted in said flanges, said casing being substantially rectangular and the lower edge portion thereof resting directly on said base plate, said casing being shiftable toward and from the uprights while in sliding contact with said base plate.

2. A spot vulcanizer for repairing tires while mounted on a vehicle comprising a base, free of obstructions throughout its major body portion, adapted to be slid between a floor and tread of the mounted tire when the latter is slightly jacked above the floor, said base being capable of partly seating the tire when the latter is lowered to the floor and the co-acting load of the vehicle comes to rest thereon, said base being provided with rigid upright means at one end, a jack disposed in end thrust relation with said upright means, and a hot plate carried by said jack and adapted to be pressed and held by the latter in working contact with said tire.

3. A spot vulcanizer for repairing tires while mounted on a vehicle comprising a base, upright means rigid with and rising from an end portion of said base and adapted to be spaced from an adjacent side wall of said tire, a jack, engageable at its outer end with said upright means, and a spot vulcanizing hot plate operatively connected with said jack, and a thrust block separably mounted on said hot plate and adapted to conformably contact said tire wall, said jack serving to hold said block firmly against said tire wall and said hot plate.

4. In a structural assemblage of the class described a horizontally elongated base adapted to rest level and firmly on a floor, said base being adapted to seat a heavy-duty tire while latter is mounted on a vehicle, being free of injurious projections and obstructions and being anchored in place between the floor and tire when load of the latter is superimposed on said base, upright means rigidly mounted on an outer end portion of said base, a hot plate to contact an injured portion of said tire, and an adjustable end thrust device to hold said hot plate in operative position, said upright means serving to locate and adjustably support the outer end of said thrust device.

BEN GOODMAN.

REFERENCES CITED

The following references are of record in the file of this patent:

UNITED STATES PATENTS

| Number | Name | Date |
|---|---|---|
| 1,015,893 | Keeler | Jan. 10, 1912 |
| 1,064,538 | Quickel | June 10, 1913 |
| 1,441,738 | Montgomery | Jan. 9, 1923 |
| 1,517,309 | Morgan | Dec. 2, 1924 |
| 1,521,764 | Graver | Jan. 6, 1925 |
| 1,718,485 | O'Sullivan | June 25, 1929 |
| 1,767,682 | Kelly | June 24, 1930 |
| 1,915,345 | Woznack | June 27, 1933 |
| 2,158,703 | Kite | May 16, 1939 |
| 2,233,371 | Smith | Feb. 25, 1941 |
| 2,372,975 | Bryant | Mar. 27, 1945 |
| 2,373,975 | Plumeau et al. | Apr. 17, 1945 |